Sept. 29, 1953     F. WELLMAN     2,653,641
STOP NUT
Filed April 25, 1951
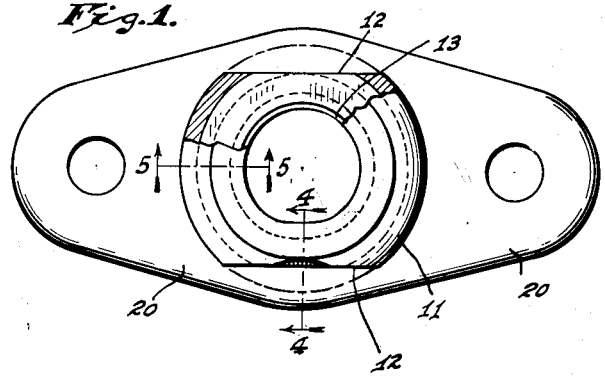
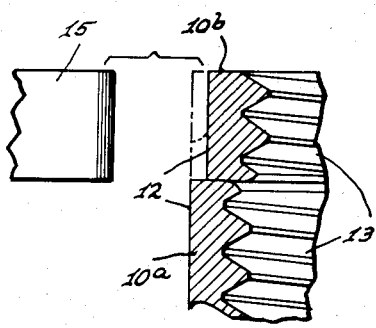
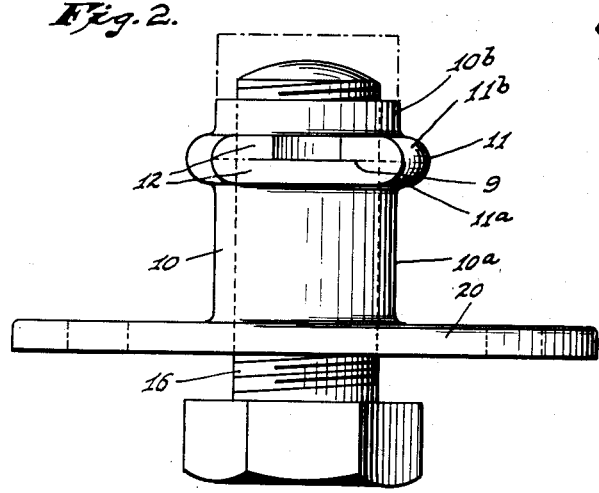
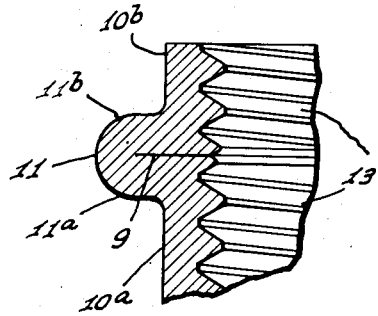
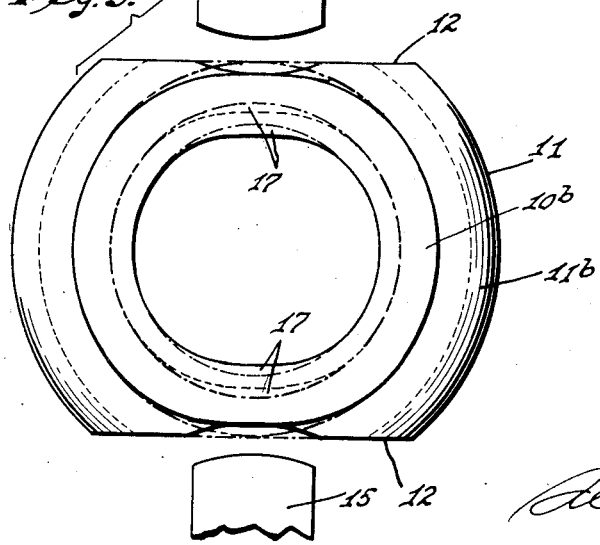
INVENTOR.
FRED WELLMAN,
BY
ATTORNEYS.

Patented Sept. 29, 1953

2,653,641

UNITED STATES PATENT OFFICE 2,653,641

STOP NUT

Fred Wellman, Indianapolis, Ind.

Application April 25, 1951, Serial No. 222,889

4 Claims. (Cl. 151—21)

This invention relates to screw-threaded fastening devices, such as self-locking nuts or stop nuts, and more particularly to such a nut having a tubular body with a locking section which, after the nut is tapped, is reshaped in whole or in part to grip the thread of the associated screw resiliently and independently of seating pressure. Such nuts have as heretofore made possessed certain disadvantages. One nut of the type described, comprising body and locking sections interconnected by bowed elastic struts and subjected after tapping to a relative axial displacement, has the disadvantage that the locking section contributes nothing to load-carrying capacity and may be knocked askew with the result that the screw may not enter it. Another nut, formed with axially extending inwardly directed petals bent further inwardly after tapping, is open to the ojections that the flexible petals lack load-carrying capacity, and, further, that the bending of the petals changes the orientation of the thread-flanks, thereby causing mismating with the threads of the screw, creating localized pressure concentrations, and accelerating wear. In a third nut, in which the nut-wall is thinned to a vanishing point at the top and squeezed inward and downward at this point into an oval form, the locking section is so weakened that the mis-mating of threads caused by the squeezing operation may result in thread rupture when the screw is driven into it under power.

It is an object of my invention to produce a nut of the type described in which the locking section will be capable of carrying a full share of the load, and not be susceptible to damage from external or internal forces. A further object of the invention is to produce a nut in which the displacement of the locking section will be limited and localized to its most elastic portion, with unchanged orientation of the thread-flanks, for smooth engagement, evenly balanced distribution of locking pressures, maximum recovery, and reduced wear. Still another object of the invention is to produce a nut which can be simply and economically manufactured.

In carrying out the invention in its preferred form, a tubular body which is to constitute the nut is upset axially to provide an outwardly projecting, circumferential fold in the metal which extends beyond the outer diameter of the tubular nut body thereby forming upper and lower flanges which are tightly pressed together. The abutment between the flanges of the fold divides the nut body into an upper locking section and a lower seating section, and the nut is tapped in that condition. Either before or after the tapping operation, the outwardly projecting metal of the fold is cut away on opposite sides of the nut to expose the abutment between the flanges of the fold, and, edgewise, the engaging faces of said flanges, while leaving them integrally joined at their ends. The locking section of the nut is then displaced radially to a calculated extent at its thinnest point so that it will provide a controlled interference fit with the co-operating screw.

The accompanying drawing illustrates the invention; Fig. 1 is an end elevation of the nut with a portion of the locking section broken away; Fig. 2 is a side elevation of the nut and an associated screw, the nut being shown in full lines in its final form and in chain lines in the form it occupies prior to the upsetting operation; Fig. 3 is an end elevation of the locking section of the nut on a greatly enlarged scale and includes a showing of tools suitable for use in reshaping the locking section; and Figs. 4 and 5 are fragmental axial sections, also on an enlarged scale, on the lines 4—4 and 5—5 respectively, of Fig. 1.

A nut made in accordance with my invention comprises a tubular body 10 which initially has the length indicated by chain lines in Fig. 2 but which is upset axially to provide an outwardly projecting fold 11. The upsetting operation is carried to such an extent that the lower and upper flanges formed in the fold, designated respectively as 11a and 11b (Fig. 5), are forced into firm abutment with each other as indicated at 9. The fold as formed by the upsetting operation is initially circular in shape, as indicated by the chain lines in Fig 1, but is subsequently cut away on opposite sides to expose the abutment between the flanges at 9 for a considerable distance and to provide each of said flanges with parallel side faces 12. The abutment 9 between the flanges may be regarded as dividing the body 10 into a seating section 10a and a locking section 10b, and the two flanges 11a and 11b constitute substantial reinforcements integral respectively with the seating section 10a and the locking section 10b and integrally joined together between the side faces 12.

The nut, formed as so far described, is tapped to provide internal screw threads 13 in both the seating section 10a and locking section 10b. During this tapping operation, the two flanges 11a and 11b remain in abutment, so that the threads in the locking section will be "in phase" with those of the seating section.

Following the tapping operation, the metal of the locking section 10b is displaced slightly in a direction normal to the side-faces 12 of the flanges. Conveniently this reshaping of the locking section is effected by opposed forming tools such as are indicated at 15 in Fig. 3. In the reshaping operation, the two tools 15, which have convexly arcuate working faces, engage the flange 11b at the reduced mid-points of its side faces 12 and displace it and integral metal above (together constituting locking section 10b) from the form illustrated in chain lines to the form illustrated in full and dotted lines in Fig. 3.

In the specific structure illustrated in the drawing, the side faces 12 of the flanges 11a and 11b, prior to the displacing operation effected by the tools 15, are plane and tangential to the seating and locking sections 10a and 10b. As a result, the flange 11b, which is relatively wide radially at its ends where it joins the flange 11a, decreases in its radial width toward the mid-points of the sides 12 until, at those mid-points it becomes effectively non-existent. The convex reshaping tools 15 produce greatest displacement of the metal of the locking section 10b at points where the flange 11b is non-existent, and the extent of metal-displacement decreases progressively as the radial width of the flange increases toward the ends of the flange. Those segments of the locking section which lie within and immediately above the wider portions of the flange 11b remain substantially in their original circular position, due to the reinforcement provided by the flange, and smoothly join the inwardly displaced segments of the locking section.

It will be noted from Figs. 3 and 4 that the displaced segments of the locking section 10b are displaced substantially translationally, without cocking or alteration of the inclination of the flanks of the threads 13.

Each of the small crescent-shaped areas 17 (Fig. 3) represents a zone of interference between the internal threads 13 of the locking section and the external threads on the screw 16. The radial width of each area 17 at any point is a measure of the extent to which the metal of the locking section at that point must be displaced outwardly when the screw is inserted. It will be noted that the greatest outward displacement will occur at the center of each zone 17 where the feathering-out of the flange 11b renders the locking portion most flexible and that the extent of outward displacement decreases toward the ends of the zone, as the increasing width of the flange imparts increasing rigidity to the locking section. The progressive increase in the extent of outward displacement with progressively increasing flexibility, from the ends toward the centers of the zones 17, tends to prevent destructive concentrations of bearing pressure between the threads of the screw and the threads of the locking section as the screw restores the locking section to its initial circular conformation. Further, the arched form of displacement, shown in the reduced, flexible center portions of the side faces 12 of flange 11b (Fig. 3) places the metal at the face of such portions under compression from the threads of the bolt, as in a convexly bowed leaf spring, which restores itself to original position when relieved of load. Ability of the flexible center portions to recover their displaced position is thereby materially increased, following removal of the bolt, and reusability is correspondingly improved. Finally, since there has been neither cocking of the threads of the locking portion nor axial displacement of those threads relative to the seating section 10a, bearing pressures are divided substantially equally between both flanks of each thread-turn. The relatively large bearing areas within the zones 17 between the threads of the screw and the threads of the locking section, together with the avoidance of load concentrations in such zones, reduce wear and eliminate likelihood of damage when the screw is inserted. As a result, the nut may be repeatedly reused without undue loss of locking torque.

As the two flanges 11a and 11b are in firm supporting engagement with each other over the extent of their contacting faces 9, the locking section of the nut is capable of sharing fully the load transmitted to the nut through the co-operating screw. This effect permits a reduction in the length of the seating section 10a and contributes to the economical use of material. Further, the fact that the flanges 11a and 11b are integral with each other, and respectively integral with nut-sections 10a and 10b reduces the possibility of any accidental relative displacement which would interfere with passage of the screw.

While I have shown the faces 12 of the flanges 11a and 11b as plane in their original form, it is not essential that they be plane. Likewise, it is not essential that those faces 12 be accurately flush with, or tangential to, the outer surfaces of the nut-portions 10a and 10b. It is desirable, however, that flange 11b be of such form that the locking section will possess a sharply increasing rigidity from the mid-points of the sides 12 toward the ends thereof. The drawings contemplate that the displacement effected by the tools 15 will be confined to the locking section 10b but no harm would result if those tools overlapped the seating section 10a of the nut to some extent. If, as contemplated in the drawings, the displacement effected by the tools 15 is confined to the locking section, the removal of metal exposing the abutment 9 and providing the side faces 12 may be confined to the flange 11b. It is desirable that the tools 15 extend substantially for the full axial length of the locking section, in order that inward displacement will be uniform throughout the full axial extent of the locking section.

The nut shown in the drawing is provided with ears 20 through the medium of which it can be attached to another member. It will be understood, however, that this invention is not concerned with characteristics imparted to the nut to adapt it for attachment to other elements, or to adapt it for application of a wrench.

I claim as my invention:

1. A stop-nut having a tubular body upset axially to produce an outwardly extending fold which forms a pair of integral reinforcing flanges abutting each other and dividing the nut body into aligned seating and locking sections, said sections being internally screw-threaded, the flange of the locking section being cut away on opposite sides to expose the abutment between the flanges, the material of the locking section, for a limited circumferential extent, adjacent the mid-points of said cut-away sides, being displaced inwardly while leaving the remaining reinforced portions of the locking section within and contiguous to the flange substantially in their original circular condition.

2. A stop-nut having aligned, internally threaded seating and locking sections, the adjacent ends of which have abutting reinforcing flanges, each of the flanges having a minimum radial width at two diametrically opposite points and increasing to a maximum in radial width in both directions from each of said points, said two flanges being in one piece at the outer edge of their maximum-width portions but severed at their points of minimum width, diametrically opposite segments of said locking section at the minimum-width portions of its integral flange being inwardly displaced while the maximum-width portion of the locking section remains substantially in its original circular condition.

3. A nut as set forth in claim 2 with the addition that the inward displacement of said locking section is of greatest extent at the point where the integral flange has its minimum width.

4. A stop-nut having a tubular body with aligned internally threaded lower seating and upper locking sections abutting on one another, said locking section including at least one sector having a free lower edge of limited circumferential extent, said seating and locking sections being integrally joined beyond the circumferential limits of said sector, and said sector being inwardly displaced, said locking section being provided with an external, integral circumferentially extending stiffening flange of graduated radial width throughout the extent of said sector, having its minimum width adjacent the center of the sector, and increasing in radial width toward the ends of the sector.

FRED WELLMAN.

References Cited in the file of this patent

UNITED STATES PATENTS

| Number | Name | Date |
|---|---|---|
| 2,007,293 | Cayouette | July 9, 1935 |
| 2,304,311 | Luce | Dec. 8, 1942 |
| 2,317,094 | Chaffee | Apr. 20, 1943 |
| 2,454,444 | Poupitch | Nov. 23, 1948 |